(12) United States Patent
Pregitzer et al.

(10) Patent No.: US 9,876,433 B2
(45) Date of Patent: Jan. 23, 2018

(54) REDUCTION OF AUDIBLE NOISE IN A POWER CONVERTER

(71) Applicant: POWER INTEGRATIONS, INC., San Jose, CA (US)

(72) Inventors: Ricardo Luis Janezic Pregitzer, Campbell, CA (US); Peter Vaughan, Los Gatos, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 15/055,339

(22) Filed: Feb. 26, 2016

(65) Prior Publication Data

US 2017/0250614 A1 Aug. 31, 2017

(51) Int. Cl.
*H02M 3/335* (2006.01)
*H02M 1/08* (2006.01)
*H02M 3/156* (2006.01)
*H02M 1/00* (2006.01)

(52) U.S. Cl.
CPC ......... *H02M 3/33515* (2013.01); *H02M 1/08* (2013.01); *H02M 3/156* (2013.01); *H02M 3/335* (2013.01); *H02M 3/33507* (2013.01); *H02M 2001/0009* (2013.01)

(58) Field of Classification Search
CPC ... H02M 3/335; H02M 3/33507; H02M 3/156
See application file for complete search history.

(56) References Cited

U.S. PATENT DOCUMENTS

| 6,525,514 | B1 | 2/2003 | Balakrishnan et al. |
| 9,214,851 | B1 * | 12/2015 | Mao ........................ H02M 1/08 |
| 9,246,392 | B2 | 1/2016 | Balakrishnan et al. |
| 2007/0047268 | A1 * | 3/2007 | Djenguerian ..... H02M 3/33515 363/21.13 |
| 2010/0302811 | A1 * | 12/2010 | Saint-Pierre .......... H02M 1/425 363/21.01 |

(Continued)

OTHER PUBLICATIONS

Extended European Search Report dated Jul. 20, 2017 for International Application No. 17153948.9, 8 pages.

(Continued)

*Primary Examiner* — Timothy J Dole
*Assistant Examiner* — Ishrat Jamali
(74) *Attorney, Agent, or Firm* — Christensen O'Connor; Johnson Kindness PLLC

(57) ABSTRACT

A controller for use in a power converter includes a drive circuit coupled to generate a drive signal to control switching of a power switch of the power converter in response to a feedback signal to control a transfer of energy from an input to an output of the power converter. An audible noise window circuit is coupled to generate a frequency skip signal in response to the feedback signal. The frequency skip signal is activated in response to a frequency of a feedback request signal responsive to the feedback signal being within an audible noise window. An audible noise reduction circuit is coupled to output a reduction signal in response to the frequency skip signal. The drive circuit is coupled to generate the drive signal in response to the reduction signal from the audible noise reduction circuit.

18 Claims, 9 Drawing Sheets

(56) References Cited

U.S. PATENT DOCUMENTS

| | | | |
|---|---|---|---|
| 2014/0177290 A1* | 6/2014 | Zhang | H02M 3/33507 363/21.13 |
| 2015/0200599 A1* | 7/2015 | Mao | H02M 3/33507 363/21.17 |
| 2015/0295500 A1* | 10/2015 | Mao | H02M 3/33515 363/21.13 |
| 2015/0303812 A1* | 10/2015 | Mao | H02M 3/33515 363/21.13 |
| 2015/0333630 A1* | 11/2015 | Pastore | H02M 3/33507 363/21.17 |

OTHER PUBLICATIONS

U.S. Appl. No. 15/055,337, filed Feb. 26, 2016, Balakrishnan et al.

* cited by examiner

REDUCTION OF AUDIBLE NOISE IN A POWER CONVERTER

BACKGROUND INFORMATION

Field of the Disclosure

The present invention relates generally to power converters, and more specifically controllers reducing the effects of audible noise associated at low switching frequencies during light load conditions.

Background

Electronic devices use power to operate. Switched mode power converters are commonly used due to their high efficiency, small size and low weight to power many of today's electronics. Conventional wall sockets provide a high voltage alternating current. In a switch mode power converter, a high voltage alternating current (ac) input is converted to provide a well-regulated direct current (dc) output through an energy transfer element. The switched mode power converter control circuit usually provides output regulation by sensing one or more inputs representative of one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
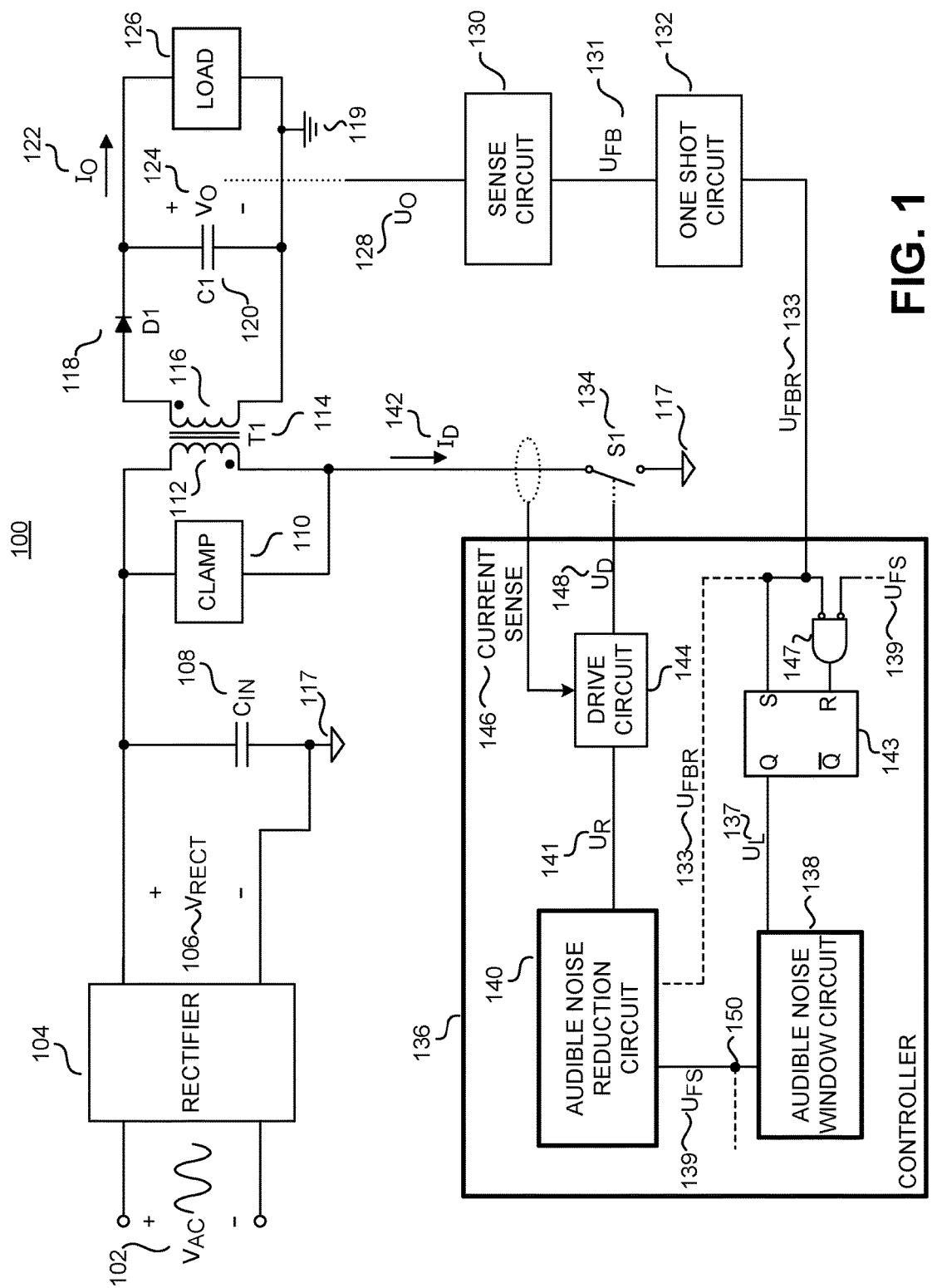
FIG. 1 shows a block diagram schematic of one example of a flyback switch mode power converter that includes a controller, in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

A controller for a power converter controls the switching of a power switch to maintain regulation based on design parameters. For a power converter such as a flyback converter, a transformer is used to transfer energy from a primary winding to a secondary winding. The amount of energy that is transferred is controlled by the switching of a power switch. During a light load condition, the switching frequency of the power switch decreases in order to reduce the power dissipation as required per efficiency requirements. For switching frequencies below 20 kHz, the mechanical resonance of the transformer contributes to audible noise. Examples in accordance with the teachings of the present invention reduce the effect of audible noise by preventing the switching of the power switch at certain frequencies.

In one example, the controller for the power converter may want to skip a frequency associated with light load conditions. In other words, the switching within a frequency range can be avoided. To prevent switching within this frequency range, the controller may force the power switch to pulse for consecutive cycles, such that the next switching cycle occurs outside the audible noise range.

In another example, the controller for the power converter adjusts the current limit of the power switch depending on the load. During a light load condition, increasing the current limit may inject more energy that may consequently add to the audible noise. Examples in accordance with the teachings of the present invention may hold the current limit under certain conditions for a number of cycles to reduce audible noise. In other words, the state of the current limit may remain fixed for one or more cycles during a light load condition.

To illustrate FIG. 1 shows a functional block diagram of an example power converter 100 is illustrated including ac input voltage $V_{AC}$ 102, a rectifier 104, a rectified voltage $V_{RECT}$ 106, an energy transfer element T1 114, a primary winding 112 of the energy transfer element T1 114, a secondary winding 116 of the energy transfer element T1 114, a power switch S1 134, input return 117, a clamp circuit 110, a rectifier D1 118, an input capacitor $C_{IN}$ 108, an output capacitor C1 120, a load 126, a sense circuit 130, a one shot circuit 132, and a controller 136.

Controller 136 further includes a drive circuit 144, an audible noise window circuit 138, an audible noise reduction circuit 140, and a latch 143. Controller 136 further includes a drive signal $U_D$ 148, a frequency skip signal $U_{FS}$ 139, a reduction signal $U_R$ 141, an output latch signal $U_L$ 137, and a current sense signal 146.

The audible noise window circuit 138 is coupled to receive the output latch signal $U_L$ 137 and output a frequency skip signal $U_{FS}$ 139. The audible noise reduction circuit 140 is coupled to receive the frequency skip signal $U_{FS}$ 139 from the audible noise window circuit and output a reduction signal $U_R$ 141. In one example, the audible noise reduction circuit is optionally coupled receive the feedback request signal $U_{FBR}$ 133.

FIG. 1 further illustrates an output voltage $V_O$ 124, an output current $I_O$ 122, an output quantity $U_O$ 128, a feedback signal $U_{FB}$ 131, a switch current $I_D$ 142, a current sense signal 140, and a feedback request signal $U_{FBR}$ 133.

The example switched mode power converter 100 illustrated in FIG. 1 is coupled in a flyback configuration, which is just one example of a switched mode power converter that may benefit from the teachings of the present invention. It is appreciated that other known topologies and configurations of switched mode power converters may also benefit from the teachings of the present invention. In addition, the example power converter shown in FIG. 1 is an isolated power converter. It should be appreciated that non-isolated power converters may also benefit from the teachings of the present invention.

The power converter 100 provides output power to the load 126 from an unregulated input voltage. In one embodiment, the input voltage is the ac input voltage $V_{AC}$ 102. In another embodiment, the input voltage is a rectified ac input voltage such as rectified voltage $V_{RECT}$ 106. The rectifier 104 outputs rectified voltage $V_{RECT}$ 106. In one embodiment, rectifier 104 may be a bridge rectifier. The rectifier 104 further couples to the energy transfer element T1 114. In some embodiments of the present invention, the energy transfer element T1 114 may be a coupled inductor. In other embodiments, the energy transfer element T1 114 may be a transformer. In a further example, the energy transfer element T1 114 may be an inductor. In the example of FIG. 1, the energy transfer element T1 114 includes two windings, a primary winding 112 and a secondary winding 116. However, it should be appreciated that the energy transfer element T1 114 may have more than two windings. In the example of FIG. 1, primary winding 112 may be considered an input winding, and secondary winding 116 may be considered an output winding. The primary winding 112 is further coupled to switch S1 134, which is then further coupled to input return 117.

In addition, a clamp circuit 110 is illustrated in the example of FIG. 1 as being coupled across the primary winding 112 of the energy transfer element T1 114. The input capacitor $C_{IN}$ 108 may be coupled across the primary winding 112 and switch S1 134. In other words, the input capacitor $C_{IN}$ 108 may be coupled to the rectifier 104 and input return 117.

Secondary winding 116 of the energy transfer element T1 114 is coupled to the rectifier D1 118. In the example of FIG. 1, the rectifier D1 118 is exemplified as a diode. However, in some embodiments the rectifier D1 118 may be a transistor used as a synchronous rectifier. Both the output capacitor C1 120 and the load 126 are shown in FIG. 1 as being coupled to the rectifier D1 118. An output is provided to the load 126 and may be provided as either a regulated output voltage $V_O$ 124, regulated output current $I_O$ 122, or a combination of the two.

The power converter 100 further comprises circuitry to regulate the output, which is exemplified as output quantity $U_O$ 128. In general, the output quantity $U_O$ 128 is an output voltage $V_O$ 124, an output current $I_O$ 122, or a combination of the two. A sense circuit 130 is coupled to sense the output quantity $U_O$ 128 and to provide feedback signal $U_{FB}$ 131, which is representative of the output quantity $U_O$ 128. Feedback signal $U_{FB}$ 131 may be a voltage signal or a current signal. In one example, the sense circuit 130 may sense the output quantity $U_O$ 128 from an additional winding included in the energy transfer element T1 114.

In another example, there may be a galvanic isolation (not shown) between the controller 136 and the sense circuit 130. The galvanic isolation could be implemented by using devices such as an opto-coupler, a capacitor or a magnetic coupling. In a further example, the sense circuit 130 may utilize a voltage divider to sense the output quantity $U_O$ 128 from the output of the power converter 100.

The one shot circuit 132 is coupled to the sense circuit 130. Controller 136 is coupled to receive the feedback request signal $U_{FBR}$ 133 from the one shot circuit 132. The controller 136 further includes terminals for receiving the current sense signal 146, and provides the drive signal $U_D$ 148 to power switch S1 134. The current sense signal 146 may be representative of the switch current $I_D$ 142 in the power switch S1 134. Current sense signal 146 may be a voltage signal or a current signal. In addition, the controller 136 provides drive signal $U_D$ 148 to the power switch S1 134 to control various switching parameters to control the transfer of energy from the input of power converter 100 to the output of power converter 100. Examples of such parameters may include switching frequency, switching period, duty cycle, or respective ON and OFF times of the power switch S1 134.

In operation, once the feedback signal $U_{FB}$ 131 drops below a certain threshold, the one shot circuit 132 is activated. The one shot circuit 122 is coupled to output a feedback request signal $U_{FBR}$ 133 to the controller 136. In one example, the feedback request signal $U_{FBR}$ 133 is a pulse. In one example, the length of the pulse can be a constant value. In another example, the length of the pulse can vary. The feedback request signal $U_{FBR}$ 133 indicates to the controller 136 a parameter, such as an output voltage $V_O$ 124, an output current $I_O$ 122, or an output quantity $U_O$ 128, has dropped below a threshold, and controller 136 should turn on the power switch S1 134.

During a light load condition, the controller 136 may detect if a received feedback request signal $U_{FBR}$ 133 is within the audible noise window. In one example, the audible noise window can be from 1 kHz to 20 kHz. The latch 143 is set by the feedback request signal $U_{FBR}$ 133, and generates output latch signal $U_L$ 137 in response. The audible noise window circuit 138 receives the output latch signal $U_L$ 137 from latch 143. If the audible noise window circuit 138 determines that the feedback request signal $U_{FBR}$ 133 is within the audible noise window in response to the output latch signal $U_L$ 137, the frequency skip signal $U_{FS}$ 139 may transition to a logic high. If the audible noise window circuit 138 determines that the feedback request signal $U_{FBR}$ 133 is not within the audible noise window in response to output latch signal $U_L$ 137, the frequency skip signal $U_{FS}$ 139 may transition to a logic low.

Latch 143 is further coupled to a logic gate 147. In one example, logic gate 147 is an AND gate coupled to an inverter at each of the inputs. Logic gate 147 is coupled to receive the feedback request signal $U_{FBR}$ 133 at one of the inputs, and the frequency skip signal $U_{FS}$ 139 at the other input by via 150. Latch 143 may be reset after the frequency skip signal $U_{FS}$ 139 transitions to a logic low and the feedback request signal $U_{FBR}$ 133 is a logic low. This indicates the operation of the audible noise window circuit 138 is completed, and latch 143 should be cleared for the next incoming feedback request signal.

The audible noise reduction circuit 140 is coupled to receive frequency skip signal $U_{FS}$ 139 to determine if the controller 136 should adjust the switching parameters due to the detected audible noise condition. In one example, the audible noise reduction circuit 140 outputs a reduction signal $U_R$ 141 such that a double pulse of the drive signal $U_D$ 148 occurs. In another example, the audible noise reduction 140 may hold a current limit of a current limit generator circuit under certain conditions for a number of cycles to reduce audible noise. In other words, the state of the current limit may remain fixed for one or more cycles during a light load condition. Further details of the audible noise reduction circuit will be discussed in detail below in connection with FIG. 4A and FIG. 4B.

Figure 2:
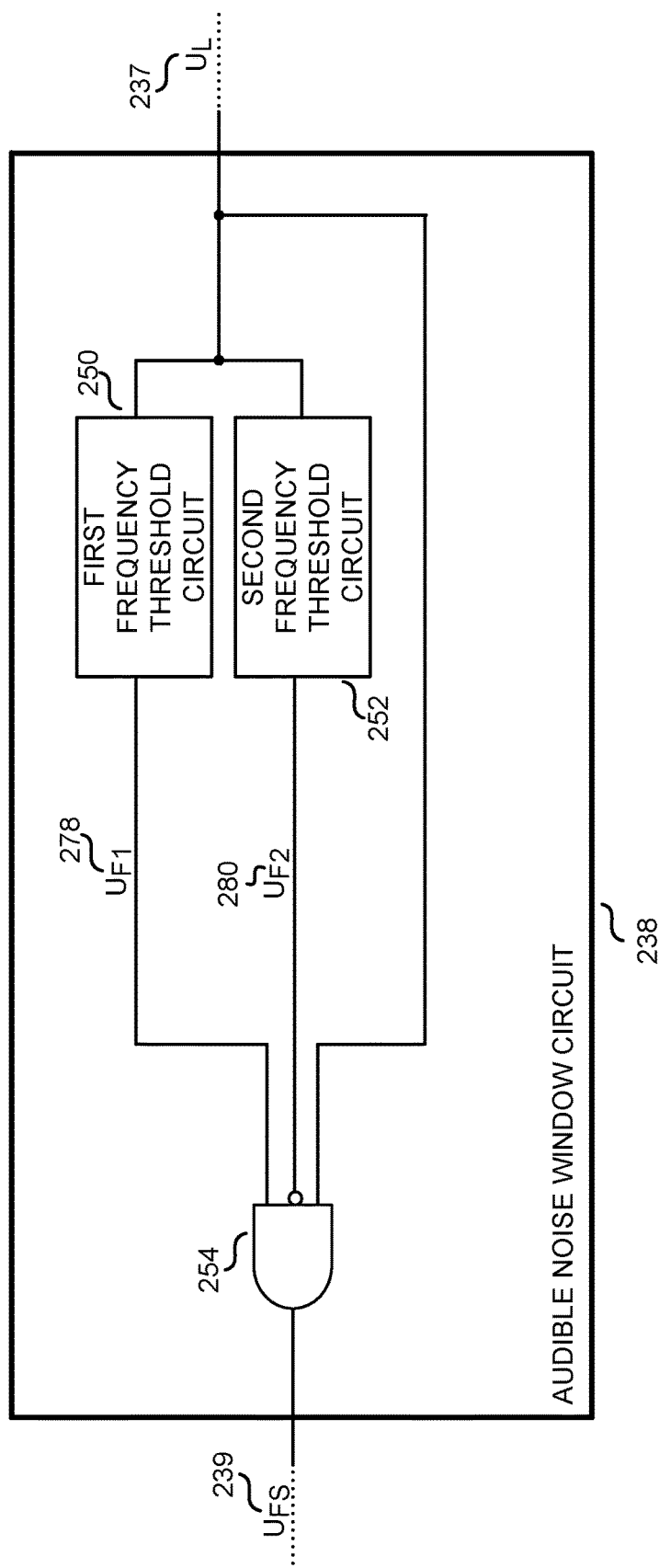
FIG. 2 shows a block diagram schematic of an audible noise window circuit, in accordance with the teachings of the present invention.

FIG. 2 shows a block diagram schematic of an example audible noise window circuit, in accordance with the teachings of the present invention. The audible noise window circuit 238 includes a first frequency threshold circuit 250, and a second frequency threshold circuit 252. The audible noise window circuit 238 further includes a first frequency signal $U_{F1}$ 380, a second frequency signal $U_{F2}$ 280, and a frequency skip signal $U_{FS}$ 239. The audible window circuit 238 is coupled to receive the output latch signal $U_L$ 237, which is generated in response to a feedback request signal $U_{FBR}$ 133 as discussed in FIG. 1.

As shown in FIG. 2, the first frequency threshold circuit 250 is coupled to output a first frequency signal $U_F$ 1278 indicating whether a feedback request signal has been detected at frequency above a first threshold frequency, such as 6 kHz. The second frequency threshold circuit 252 is coupled to output a second frequency signal $U_{F2}$ 280 indicating whether a feedback request signal below a second threshold frequency, such as for example 9 kHz. In other examples, different values for the first threshold frequency and second threshold frequency may be used. Logic gate 254 is coupled to receive the first frequency signal $U_{F1}$ 278 and the second frequency signal $U_{F2}$ 280 and the output latch signal $U_L$ 237 to generate a frequency skip signal $U_{FS}$ 239. In one example, logic gate 254 is a three input AND gate with one of the inputs coupled to an inverter. In one example, a transition of the frequency skip signal $U_{FS}$ 239 from a logic low to logic high may indicate the feedback request signal has occurred within the audible noise range.

Figure 3:
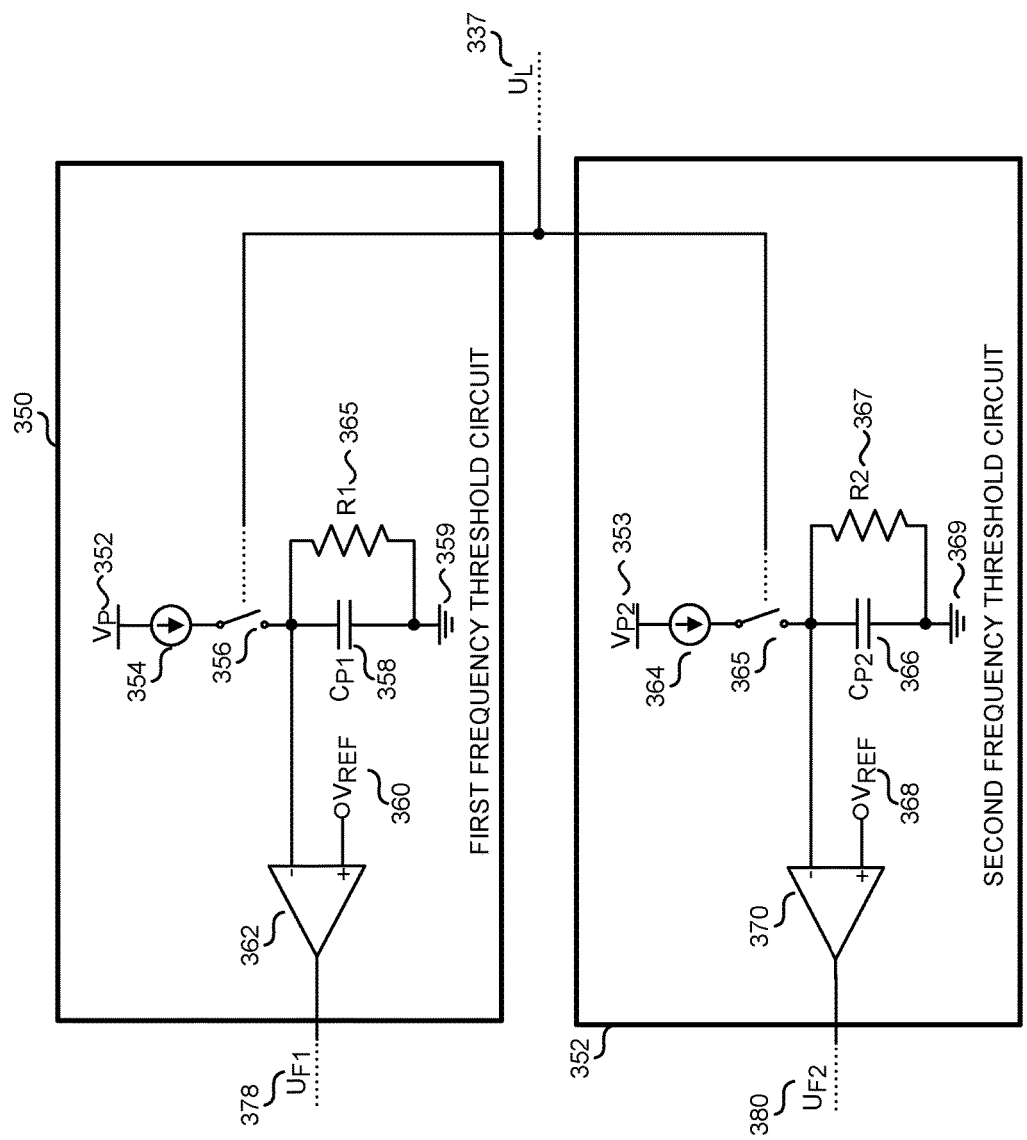
FIG. 3 shows a block diagram schematic of the first and second frequency threshold circuit, in accordance with the teachings of the present invention.

FIG. 3 shows a block diagram schematic of the first and second frequency threshold circuits 350 and 352, in accordance with the teachings of the present invention. First frequency threshold circuit 350 includes a current source 354, a switch 356, a first capacitor $C_{P1}$ 358, ground reference 359, a first resistor 365 and a comparator 362. The first frequency threshold circuit 350 further includes a voltage potential $V_P$ 352, a voltage reference $V_{REF}$ 360, and a first frequency signal $U_{F1}$ 378.

In operation, first frequency threshold circuit 350 and second frequency threshold circuit 352 operate substantially the same. A switch 356 is coupled to be switched on and off in response to the output latch signal $U_L$ 337. When the switch 356 is off, the first capacitor $C_{P1}$ 358 is discharged through resistor R1 365, which is coupled across first capacitor $C_{P1}$ 358. The first capacitor $C_{P1}$ 358 should be completely discharged prior to switch 356 being turned on. Current source 354 is coupled to voltage potential $V_P$ 352 and charges the first capacitor $C_{P1}$ 358 through switch 356 when switch 356 is switched on in response to output latch signal $U_L$ 337. The size of first capacitor $C_{P1}$ 358 may be selected depending on what frequency is required to be detected. In one example, the size of the first capacitor $C_{P1}$ 358 may be smaller than the second capacitor $C_{P2}$ 366. The first frequency signal $U_{F1}$ 378 transitions to a logic high when the voltage of the first capacitor $C_{P1}$ 358 exceeds a voltage reference $V_{REF}$ 360. In another example, the first frequency threshold circuit can be implemented using a digital timer circuit. The digital timer circuit may receive a start signal from the latch signal $U_L$ 337.

Second frequency threshold circuit 352 includes a current source 364, a switch 365, a second capacitor $C_{P2}$ 366, a switch 365, a resistor 367, ground reference 369 and a comparator 370. The second frequency threshold circuit 352 further includes a second voltage potential $V_{P2}$ 353, a voltage reference $V_{REF}$ 368, and a second frequency signal $U_{F2}$ 380.

The second frequency threshold circuit 352 will be described. When switch 365 is turned off, second capacitor $C_{P2}$ 366 is discharged through resistor 367, which is coupled across second capacitor $C_{P2}$ 366. The second capacitor should be completely discharged prior to switch 365 being turned on. When the switch 365 is turned on, the current source 364 is coupled to a voltage potential $V_{P2}$ 353 that charges the second capacitor $C_{P2}$ 366 through switch 365. The size of second capacitor $C_{P2}$ 366 may vary in size depending on what frequency is required to be detected. The second frequency signal $U_{F2}$ 380 transitions to a logic high when the voltage of the second capacitor $C_{P2}$ 366 exceeds a voltage reference $V_{REF}$ 368. In another example, the second frequency threshold circuit 352 can be implemented using a digital timer circuit. The digital timer circuit may receive a start signal from the latch signal $U_L$ 337.

Figure 4A:
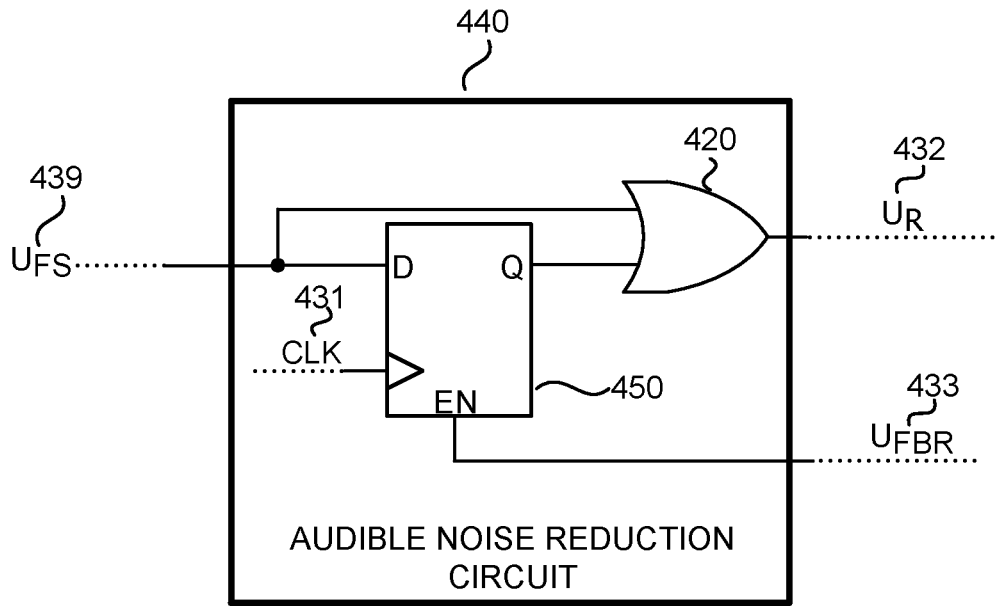
FIG. 4A shows a block diagram of an audible noise reduction circuit, in accordance with the teachings of the present invention.

FIG. 4A shows a block diagram of one example of an audible noise reduction circuit, in accordance with the teachings of the present invention. The audible noise reduction circuit 440 includes a D flip flop 450, and a logic gate 420. In one example, the logic gate 420 is an OR gate. The first input of the logic gate 420 is coupled to receive the frequency skip signal $U_{FS}$ 439, and the second input is coupled to receive the output signal of the D flip flop 450. The audible noise reduction circuit 440 is coupled to receive the feedback request signal $U_{FBR}$ 433 and the frequency skip signal $U_{FS}$ 439. The audible noise reduction circuit 440 is coupled to output a reduction signal $U_R$ 432. In one example, the reduction signal $U_R$ 432 may be a digital signal. In another example, the reduction signal $U_R$ 432 may be an analog signal.

In operation, the feedback request signal $U_{FBR}$ 433 enables the D flip flop 450 to receive the frequency skip signal $U_{FS}$ 439. If feedback request signal $U_{FBR}$ 433 is a logic low, D flip flop 450 is not activated. When the feedback request signal $U_{FBR}$ 433 is a logic high, D flip flop 450 will pass the value of the frequency skip signal $U_{FS}$ 439 according to a clock signal CLK 431. In one example, the clock signal 431 may come from an oscillator within the controller.

In one example, the frequency skip signal $U_{FS}$ 439 indicates that the feedback request signal $U_{FBR}$ 433 is within the audible noise window. The output of D flip flop 450 transitions a time after the frequency skip signal $U_{FS}$ 439 is set and is an input to logic gate 420. The controller may initiate a double pulse of the power switch such that the next switching cycle falls outside of the audible noise range via the reduction signal $U_R$ 432. The reduction signal $U_R$ 432 can be comprised of one or more pulses. For instance, in one example, the reduction signal $U_R$ 432 may comprise a double pulse to cause a corresponding double pulse of the drive signal $U_D$ 148 to adjust the switching parameters of the power switch S1 134 and reduce audio noise due to the detected audible noise condition as discussed above. The first pulse of the double pulse of the reduction signal $U_R$ 432 may be forced when the frequency skip signal $U_{FS}$ 439 is a logic high, such that the output of logic gate 420 is a logic high. The second pulse of the double pulse of the reduction signal $U_R$ 432 may be forced when the output of D flip flop 450 is a logic high, such that the output of logic gate 420 is also a logic high.

Figure 4B:
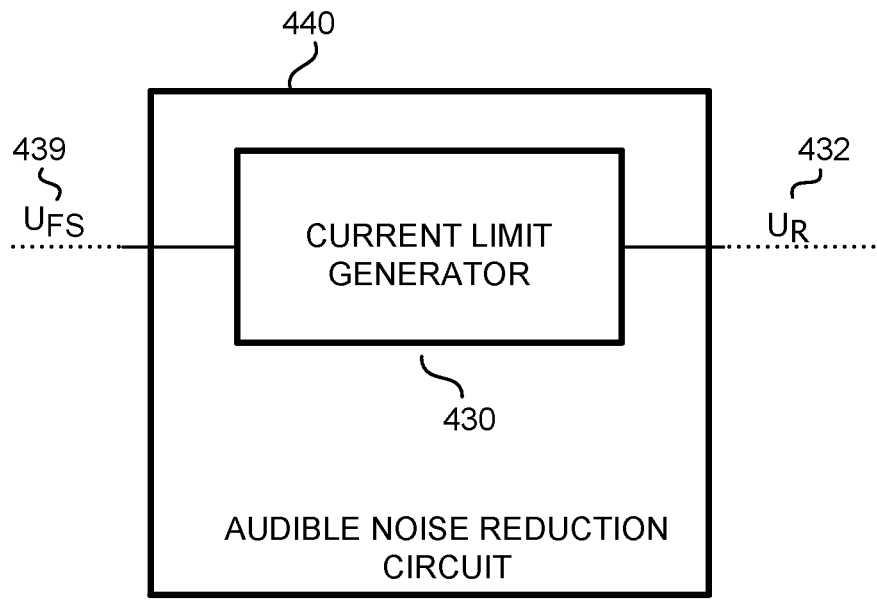
FIG. 4B shows another block diagram of an audible noise reduction circuit, in accordance with the teachings of the present invention.

FIG. 4B shows a block diagram of another example of an audible noise reduction circuit including a current limit generator 430, in accordance with the teachings of the present invention. In the example, the audible noise reduction circuit 440 of FIG. 4B is not coupled to receive the feedback request signal $U_{FBR}$ 433, like the audible noise reduction circuit 440 of FIG. 4B. The audible noise reduction circuit 440 in FIG. 4B is coupled to receive the frequency skip signal $U_{FS}$ 439 and output a reduction signal $U_R$ 432. In one example, the reduction signal $U_R$ 432 can comprise a current limit signal for the drive circuit. In normal operation, the current limit generator 430 adjusts a current limit to the load. However, increasing the current limit may inject more energy that may consequently add to the audible noise. The audible noise reduction circuit 440 may not allow the current limit generator 430 to adjust the current limit for one or more cycles if the frequency skip signal $U_{FS}$ 439 is a logic high.

Figure 5:
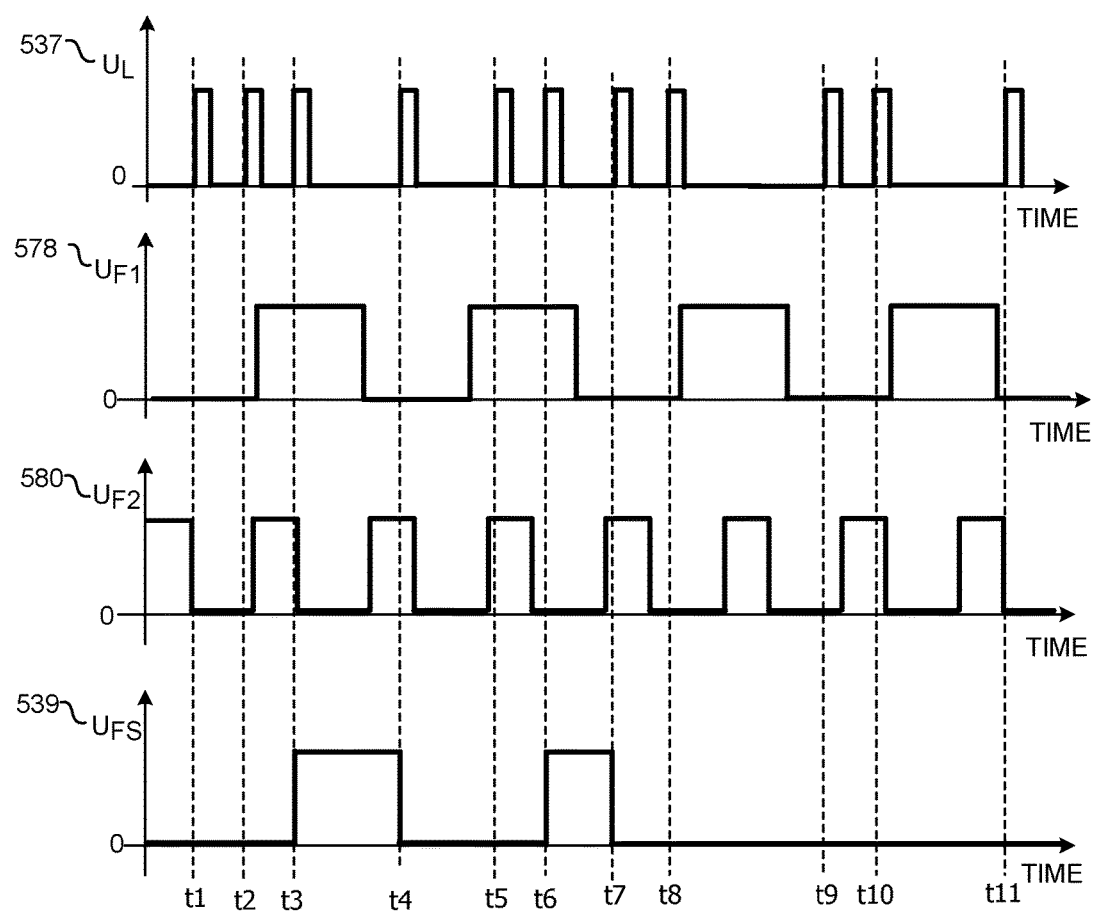
FIG. 5 illustrates an example timing diagram showing signals associated with the output latch signal, the first frequency signal, the second frequency signal, and the frequency skip signal, in accordance with the teachings of the present invention.

FIG. 5 illustrates an example timing diagram showing signals associated with the output latch signal, the first frequency signal, the second frequency signal, and the frequency skip signal, in accordance with the teachings of the present invention. The first timing diagram illustrates an output latch signal $U_L$ 537 that receives the feedback request signal from FIG. 1. The second timing diagram illustrates the output signal $U_{F1}$ 578 of the first frequency threshold circuit. The third timing diagram illustrates the output signal $U_{F2}$ 580 of the second frequency threshold circuit. The fourth diagram illustrates the frequency skip signal $U_{FS}$ 539.

In operation, the audible noise window circuit illustrated in FIG. 1 and FIG. 2 determines if output latch signal $U_L$ 537 occurs within the audible noise range. At time t1, the output latch signal $U_L$ 537 is logic high, the output signal $U_{F1}$ 578 of the first frequency threshold circuit is logic low, and the output signal $U_{F2}$ 580 of the second frequency threshold circuit is logic low. Therefore, the frequency skip signal $U_{FS}$ 539 is a logic low to indicate the feedback request signal does not occur within the audible noise range.

The frequency skip signal $U_{FS}$ 539 transitions from a logic low to a logic high when the output latch signal $U_L$ 537 is logic high, the output signal $U_{F1}$ 578 of the first frequency threshold circuit is logic high, and the output signal $U_{F2}$ 580 of the second frequency threshold circuit is logic low. This indicates the frequency of the feedback request signal $U_{FBR}$ 533 is greater than a first frequency, but less than the second frequency. If this condition is true, the frequency skip signal $U_{FS}$ 539 transitions to a logic high as seen in time t3, and t6. If the condition is not true, the frequency skip signal $U_{FS}$ transitions to a logic low as seen in times t1, t2, t5, t7, t8, t9, t10, and t11.

Figure 6:
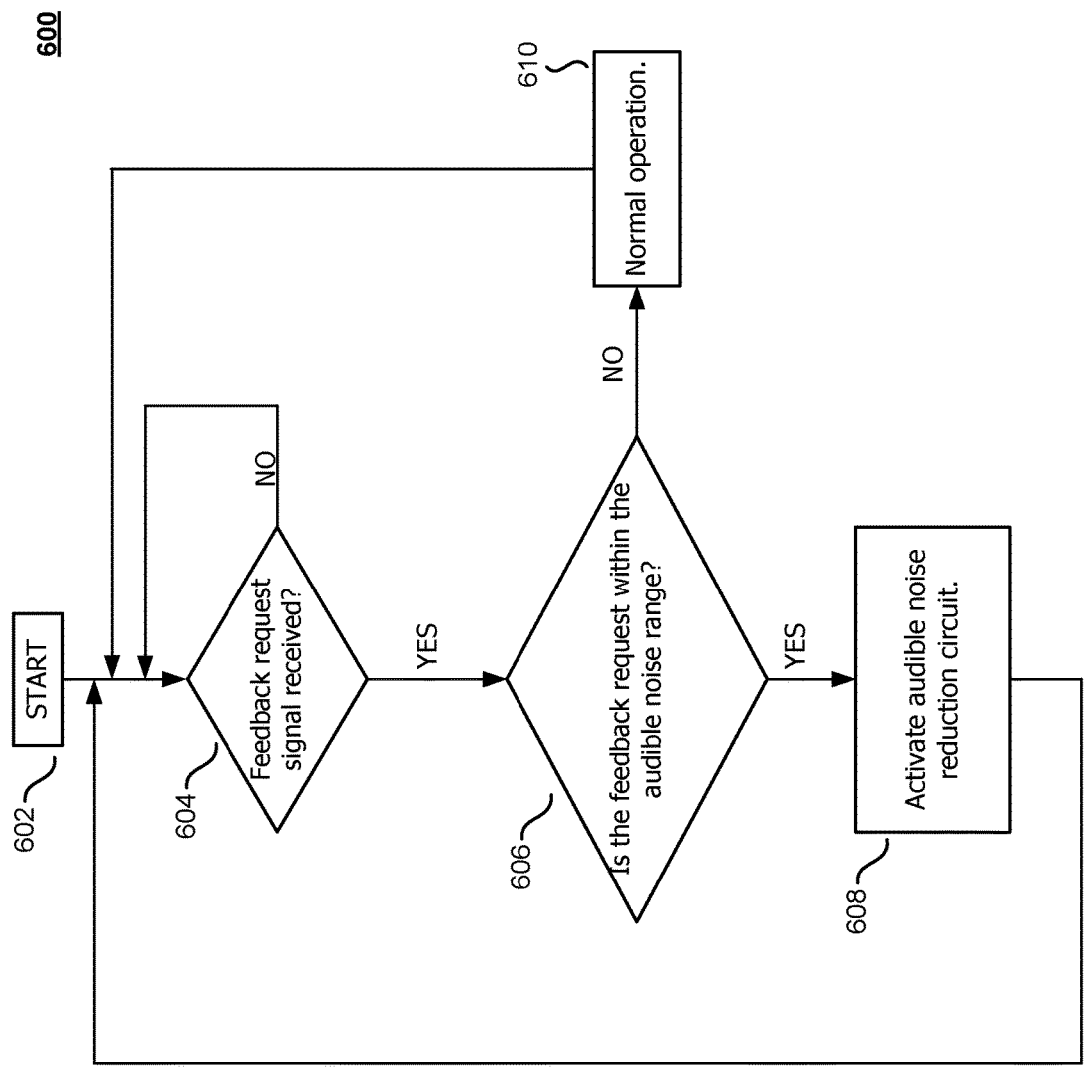
FIG. 6 is a flow chart illustrating an example process of determining if a feedback request signal is within the audible noise range, in accordance with the teachings of the present invention.

FIG. 6 is a flow chart illustrating an example process of determining if a feedback request signal is within the audible noise range, in accordance with the teachings of the present invention. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

Process 600 begins at the START block 602. Process 600 proceeds to block 604. At decision block 604, the controller (e.g., controller 136 of FIG. 1) determines if a feedback request signal has been received. If the feedback request signal has not been received, process 600 loops back to decision block 604. If a feedback request signal has been received, process 600 proceeds to decision block 606. At decision block 606, the audible noise window circuit determines if the feedback request signal is within the audible noise range. If the feedback request is not within the audible noise range, process 600 proceeds to block 610. At block 610, the power converter is in normal operation and is therefore not in a light load condition, and the controller controls the power converter under normal operating conditions. Process 600 then loops back to the beginning.

If the feedback request is within the audible noise range, process 600 proceeds to block 608. At block 608, the audible noise reduction circuit is activated as shown in previous figures.

Figure 7:
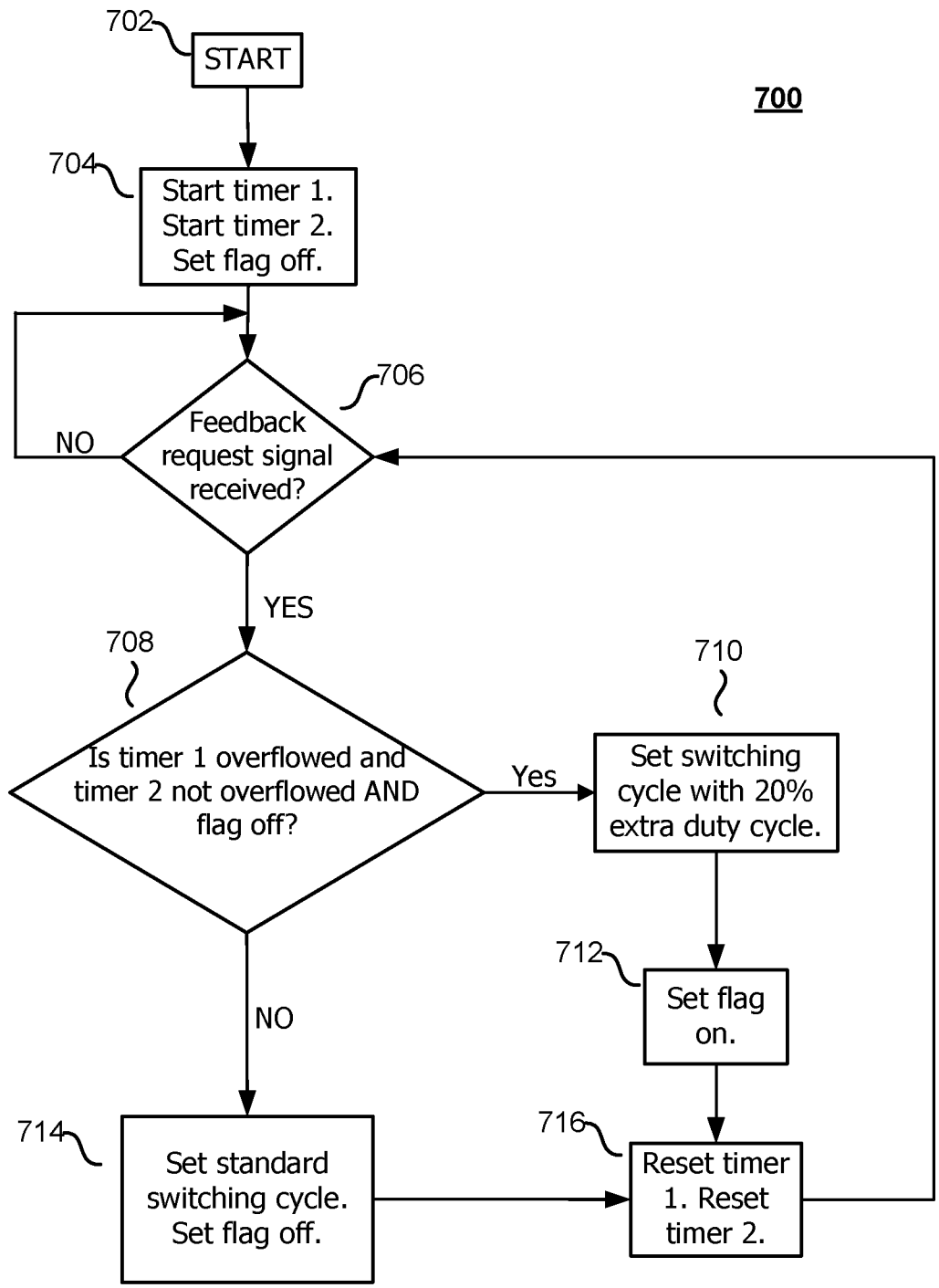
FIG. 7 is a flow chart illustrating an example process of determining if a feedback request signal is within the audible noise range, in accordance with the teachings of the present invention.

FIG. 7 is a flow chart illustrating an example process of determining if a feedback request signal is within the audible noise range, in accordance with the teachings of the present invention. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

Process 700 begins at the START block 702. Process 700 proceeds to block 704. At block 704, audible noise indication circuit of the controller (e.g., controller 136 of FIG. 1) starts a first timer, starts a second timer, and sets a flag variable to an OFF state. Process 700 proceeds to decision block 706 to determine if a feedback request signal has been received. If the feedback request signal has not been received, process 700 loops back to decision block 706. If a feedback request signal has been received, process 700 proceeds to decision block 708. At decision block 708, the audible noise indication circuit determines if the first timer is overflowed and the second timer is not overflowed, and if the flag variable is set to an OFF state. If the condition is true, process 700 proceeds to block 710. At process 710, the switching cycle is set with a 20% extra duty cycle. In another example, the switching cycle could be increased such that the next switching cycle does not occur within the audible noise range. Process 700 then proceeds to block 712. At block 712, the flag variable is set to an ON state. Process 700 then proceeds to block 716. At block 716, the first and second timers are reset. Process 700 then loops back to decision block 706.

If the condition in decision block 708 is not true, process 700 proceeds to block 714. At block 714, the switching frequency remains unchanged at a standard switching cycle, and the flag variable is set to an OFF state. Process 700 proceeds to block 716. At block 716, the first and second timers are reset. Process 700 then loops back to decision block 706.

Figure 8:
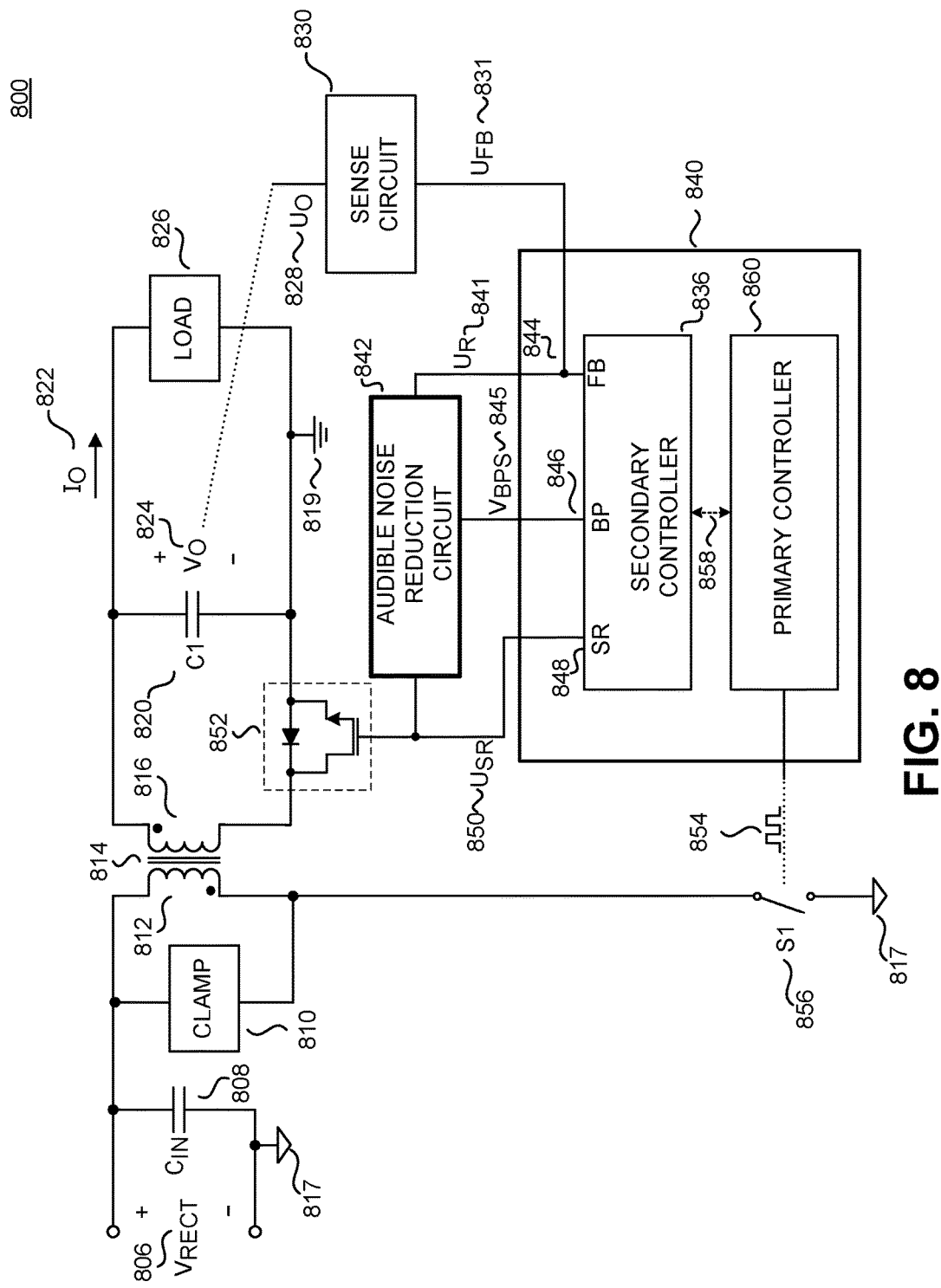
FIG. 8 shows a schematic of one example of a flyback switch mode power converter that includes an external audible noise reduction circuit, and a primary controller coupled to receive a feedback request signal from a secondary controller, in accordance with the teachings of the present invention.

FIG. 8 shows a schematic of one example of a flyback switch mode power converter 800 that includes a primary controller 860 coupled to receive a feedback request signal from a secondary controller 836 through a communication link 858, in accordance with the teachings of the present invention. As shown in the depicted example, power converter 800 further includes an input capacitor $C_{IN}$ 808, an input return 817, a clamp circuit 810, an energy transfer element T1 814, a primary winding 812, a secondary winding 816, a power switch S1 856, an output capacitor C1 820, a synchronous output rectifier 852, an output return 819, and a sense circuit 830. Further illustrated in FIG. 8 are the rectified input voltage $V_{IN}$ 806, output voltage $V_O$ 824, output current $I_O$ 822, and output quantity $U_O$ 828.

Controller 840 is further illustrated as including primary controller 860 and a secondary controller 836 with communication link 858 between the primary and secondary controllers.

The example power converter 800 shown in FIG. 8 shares some similarities with power converter 100 illustrated in FIG. 1. The primary controller 860, which in one example may be substantially similar to controller 136 of FIG. 1, is coupled to generate a drive signal 854 to control switching of power switch S1 856. However, the output rectifier 852 of power converter 800 illustrated in FIG. 8 is exemplified as a synchronous rectifier circuit, and may also include a secondary controller 836 to generate secondary drive signal $U_{SR}$ 850 to control the synchronous rectifier circuit 852. It should also be appreciated that certain elements that were illustrated in FIG. 1 in detail for explanation purposes have been omitted from FIG. 8 so as not to obscure the teachings of the present invention. Similarly named and numbered elements are coupled and function as described above.

As shown in the example depicted in FIG. 8, the synchronous rectifier circuit 852 is coupled to the secondary winding 816 and the output capacitor C1 820. In the example shown, the synchronous rectifier 852 includes a switch (exemplified as a transistor) and a diode. In one example, the diode may be an externally connected Schottky diode. The synchronous rectifier circuit 852 is coupled to receive the secondary drive signal $U_{SR}$ 850 from the synchronous rectifier terminal 848 of the secondary controller 836. The secondary controller is coupled to provide a reference bypass voltage $V_{BPS}$ 845 to the audible noise reduction circuit 842. The bypass capacitor is omitted in this figure. Primary controller 860 and the secondary controller 836 may be implemented as monolithic integrated circuits, or may be implemented with discrete electrical components, or a combination of discrete and integrated components. Primary controller 860, secondary controller 836, and switch S1 856 could form part of an integrated circuit that is manufactured as either a hybrid or monolithic integrated circuit. However it should be appreciated that both the primary controller 860 and the secondary controller 836 need not be included in a single controller package. Primary controller 860 and secondary controller 836 may communicate via a communication link 858.

Similar to FIG. 1, the secondary controller 836 receives the feedback signal $U_{FB}$ 831 and can determine whether the power switch S1 856 should be turned OFF during a given switching cycle period, or the duration of time that switch S1 856 should be turned ON during a switching cycle period. The secondary controller 836 may send a command to the primary controller 860 via the communication link 858 to control power switch S1 856. In one example, if the feedback signal $U_{FB}$ 831 falls below a threshold, the secondary controller may send a command to via the communication link 858 to control power switch S1 856. In one example, the feedback signal may be a voltage value of 1.265 volts. The primary switch S1 856 and the synchronous rectifier 852 are generally not turned on at the same time.

Power converter 800 also includes an external audible noise reduction circuit 842. The audible noise reduction circuit 842 can force the secondary controller 836 to communicate to the primary controller 860 to switch power switch S1 856. In one example, the audible noise reduction circuit 842 is coupled to the feedback terminal 844. In one example, the reduction signal $U_R$ 841 and the feedback signal $U_{FB}$ 831 are both coupled to the feedback terminal 844 as shown. The reduction signal $U_R$ 841 may alter the feedback signal $U_{FB}$ 831 to cause a next switching cycle of the power switch to fall outside of an audible range reduce audible noise. Further details of the audible noise circuit will be explained in further detail below in connection with FIG. 9.

Figure 9:
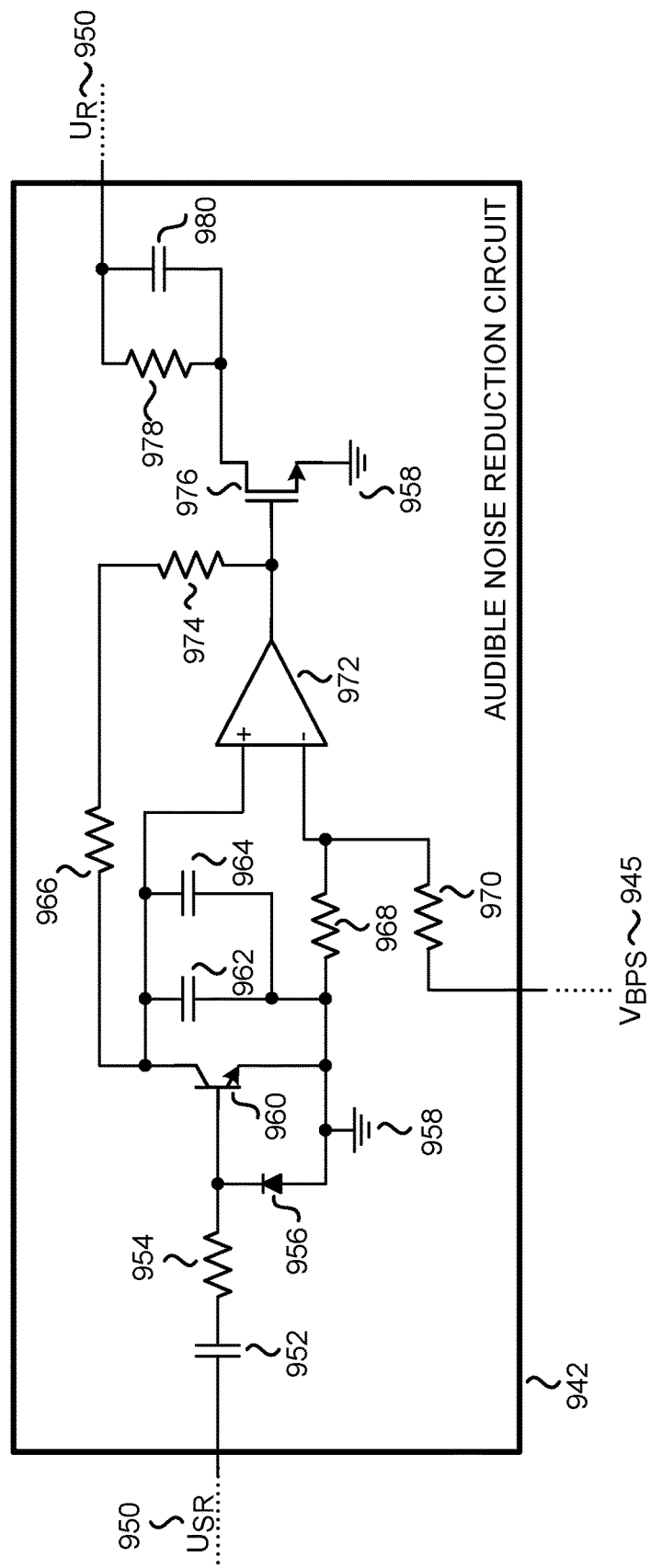
FIG. 9 illustrates a block diagram schematic of the external audible noise reduction circuit, in accordance with the teachings of the present invention.

FIG. 9 illustrates a block diagram schematic of the external audible noise reduction circuit, in accordance with the teachings of the present invention. The audible noise reduction circuit 942 includes a capacitors 952, 962, 964, 980, a resistor 954, 966, 968, 970, 974, 978, a rectifier 956, transistors 958, 960, local return 958, and comparator 972. In one example, transistor 960 is a NPN bipolar junction transistor, and transistor 976 is an N-channel MOSFET. In one example, audible noise reduction circuit 942 is coupled to receive a secondary drive signal $U_{SR}$ 950, a secondary bypass voltage $V_{BPS}$ 945, and is coupled to output a reduction signal $U_R$ 950. In one example, the secondary bypass voltage $V_{BPS}$ 945 may be a dc voltage of 4.45 volts.

In operation, comparator 972 determines if the secondary drive signal $U_{SR}$ 950 is greater than the reference secondary bypass voltage $V_{BPS}$ 945. During a logic high signal of the secondary drive signal $U_{SR}$ 950, transistor 960 is turned ON through the path of capacitor 952 and resistor 954. This causes capacitors 962 and 964 to be discharged to local return 958 through transistor 960. The input voltage of the non-inverting terminal of comparator 972 is less than the reference voltage $V_{BPS}$ 945. The output of the comparator 972 is a logic low signal, and transistor 976 is turned OFF. As such the reduction signal $U_R$ 950 does not alter the feedback signal from FIG. 8.

During a logic low signal of the secondary drive signal $U_{SR}$ 950, transistor 960 is turned OFF and causes capacitors 962 and 964 to be charged. The input voltage of the non-inverting terminal of comparator 972 is greater than the reference voltage $V_{BPS}$ 945. The output of comparator 972 is a logic high signal, and transistor 976 is turned ON. As such, current is pulled to ground reference 958. The reduction signal $U_R$ 950 reduces the feedback signal $U_{FB}$ 831 of FIG. 8 to a value lower than 1.265 volts. In one example, the new feedback signal value is reduced to 1.15 volts. In response to a lower feedback signal $U_{FB}$ 831, the primary controller 860 of FIG. 8 may set a longer ON time of the power switch S1 856.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A controller for use in a power converter, comprising: a drive circuit coupled to generate a drive signal to control switching of a power switch of the power converter in response to a current sense signal representative of a current through the power switch, and in response to a feedback signal representative of an output of the power converter, to control a transfer of energy from an input of the power converter to the output of the power converter; an audible noise window circuit coupled to generate a frequency skip signal in response to the feedback signal, wherein the audible noise window circuit is coupled to activate the frequency skip signal in response to a frequency of a feedback request signal responsive to the feedback signal being within an audible noise window; and an audible noise reduction circuit coupled to output a reduction signal in response to the frequency skip signal, wherein the drive circuit is coupled to generate the drive signal in response to the reduction signal from the audible noise reduction circuit.

2. The controller of claim 1, wherein the audible noise reduction circuit coupled to initiate a double pulse of the reduction signal in response to a detected audible noise condition to cause a next switching of the power switch to fall outside of an audible noise range.

3. The controller of claim 2, wherein the audible noise reduction circuit comprises:
a first logic gate coupled to output the reduction signal, wherein the first logic gate includes a first input coupled to receive the frequency skip signal from the audible noise window circuit, wherein a first pulse of the double pulse of the reduction signal is output in response to the frequency skip signal received at the first input of the first logic gate; and
a flip flop coupled to receive the frequency skip signal, wherein the flip flop is coupled to be enabled in response to the feedback request signal, wherein the flip flop is coupled to generate an output in response to the frequency skip signal and a clock signal when the flip flop is enabled in response to the feedback request signal, wherein a second pulse of the double pulse of the reduction signal is output in response to the output of the flip flop received at the second input of the first logic gate.

4. The controller of claim 1, wherein the audible noise reduction circuit is coupled to hold a current limit of a current limit generator circuit included in the audible noise reduction circuit for a number of cycles in response to the frequency skip signal to cause a next switching of the power switch to fall outside of an audible noise range.

5. The controller of claim 1, further comprising a latch coupled to be set in response to the feedback request signal, wherein the latch is coupled to be reset in response to the feedback request signal and the frequency skip signal.

6. The controller of claim 5, further comprising a second logic gate having an output coupled to reset the latch, wherein the second logic gate further includes a first input coupled to receive an inverted frequency skip signal, wherein the second logic gate further includes a second input coupled to receive an inverted feedback request signal.

7. The controller of claim 5, wherein the audible noise window circuit comprises:
a first frequency threshold circuit coupled to receive an output of the latch, wherein a first frequency output signal of the first frequency threshold circuit is coupled to indicate if a frequency of the feedback request signal is greater than a first threshold frequency;
a second frequency threshold circuit coupled to receive the output of the latch, wherein a second frequency output signal of the second frequency threshold circuit is coupled to indicate if the frequency of the feedback request signal is less than a second threshold frequency; and
a third logic gate coupled to output the frequency skip signal in response to the first frequency output signal, an inverted second frequency output signal, and the output of the latch.

8. The controller of claim 7, wherein the first frequency threshold circuit comprises:
a first current source;
a first capacitor;
a first resistor couple across the first capacitor;
a first switch coupled between the first current source and the first capacitor, wherein the first switch is coupled to be switched on and off in response to the output of the latch; and
a first comparator coupled to the first capacitor to output the first frequency output signal in response to a first comparison of a voltage across the first capacitor with a first voltage reference.

9. The controller of claim 8, wherein the second frequency threshold circuit comprises:
a second current source;
a second capacitor;
a second resistor couple across the second capacitor;
a second switch coupled between the second current source and the second capacitor, wherein the second switch is coupled to be switched on and off in response to the output of the latch; and
a second comparator coupled to the second capacitor to output the second frequency output signal in response to a second comparison of a voltage across the second capacitor with a second voltage reference.

10. A power converter, comprising:
- an energy transfer element coupled between an input of the power converter and an output of the power converter;
- a power switch coupled to the energy transfer element and the input of the power converter;
- a sense circuit coupled to generate a feedback signal representative of the output of the power converter; and
- a controller coupled to the power switch, wherein the controller includes:
  - a drive circuit coupled to generate a drive signal to control switching of the power switch in response to a current sense signal representative of a current through the power switch, and in response to a feedback signal, to control a transfer of energy from the input of the power converter to the output of the power converter;
  - an audible noise window circuit coupled to generate a frequency skip signal in response to the feedback signal, wherein the audible noise window circuit is coupled to activate the frequency skip signal in response to a frequency of a feedback request signal responsive to the feedback signal being within an audible noise window; and
  - an audible noise reduction circuit coupled to output a reduction signal in response to the frequency skip signal, wherein the drive circuit is coupled to generate the drive signal in response to the reduction signal from the audible noise reduction circuit.

11. The power converter of claim 10, wherein the audible noise reduction circuit coupled to initiate a double pulse of the reduction signal in response to a detected audible noise condition to cause a next switching of the power switch to fall outside of an audible noise range.

12. The power converter of claim 11, wherein the audible noise reduction circuit comprises:
- a first logic gate coupled to output the reduction signal, wherein the first logic gate includes a first input coupled to receive the frequency skip signal from the audible noise window circuit, wherein a first pulse of the double pulse of the reduction signal is output in response to the frequency skip signal received at the first input of the first logic gate; and
- a flip flop coupled to receive the frequency skip signal, wherein the flip flop is coupled to be enabled in response to the feedback request signal, wherein the flip flop is coupled to generate an output in response to the frequency skip signal and a clock signal when the flip flop is enabled in response to the feedback request signal, wherein a second pulse of the double pulse of the reduction signal is output in response to the output of the flip flop received at the second input of the first logic gate.

13. The power converter of claim 10, wherein the audible noise reduction circuit is coupled to hold a current limit of a current limit generator circuit included in the audible noise reduction circuit for a number of cycles in response to the frequency skip signal to cause a next switching of the power switch to fall outside of an audible noise range.

14. The power converter of claim 10, wherein the controller further comprises a latch coupled to be set in response to the feedback request signal, wherein the latch is coupled to be reset in response to the feedback request signal and the frequency skip signal.

15. The power converter of claim 14, wherein the controller further comprises a second logic gate having an output coupled to reset the latch, wherein the second logic gate further includes a first input coupled to receive an inverted frequency skip signal, wherein the second logic gate further includes a second input coupled to receive an inverted feedback request signal.

16. The power converter of claim 14, wherein the audible noise window circuit comprises:
- a first frequency threshold circuit coupled to receive an output of the latch, wherein an output of the first frequency threshold circuit is coupled to indicate if a frequency of the feedback request signal is greater than a first threshold frequency;
- a second frequency threshold circuit coupled to receive the output of the latch, wherein an output of the second frequency threshold circuit is coupled to indicate if the frequency of the feedback request signal is less than a second threshold frequency; and
- a third logic gate coupled to output the frequency skip signal in response to the output of the first frequency threshold circuit, an inverted output of the second frequency threshold circuit, and the output of the latch.

17. The power converter of claim 16, wherein the first frequency threshold circuit comprises:
- a first current source;
- a first capacitor;
- a first resistor couple across the first capacitor;
- a first switch coupled between the first current source and the first capacitor, wherein the first switch is coupled to be switched on and off in response to the output of the latch; and
- a first comparator coupled to the first capacitor to output the first frequency output signal in response to a first comparison of a voltage across the first capacitor with a first voltage reference.

18. The power converter of claim 17, wherein the second frequency threshold circuit comprises:
- a second current source;
- a second capacitor;
- a second resistor couple across the second capacitor;
- a second switch coupled between the second current source and the second capacitor, wherein the second switch is coupled to be switched on and off in response to the output of the latch; and
- a second comparator coupled to the second capacitor to output the second frequency output signal in response to a second comparison of a voltage across the second capacitor with a second voltage reference.

* * * * *